US012121862B2

(12) United States Patent
Chan et al.

(10) Patent No.: US 12,121,862 B2
(45) Date of Patent: Oct. 22, 2024

(54) GAS EXCHANGE SYSTEM AND METHOD

(71) Applicants:Petroliam Nasional Berhad (PETRONAS), Kuala Lumpur (MY); Dalian Institute of Chemical Physics China Academy of Science, Dalian (CN)

(72) Inventors: Zhe Phak Chan, Selangor (MY); Siti Hajar Khalit, Kuala Lumpur (MY); Yiming Cao, Dalian (CN); Guodong Kang, Liaoning (CN)

(73) Assignees: Petroliam Nasional Berhad (PETRONAS), Kuala Lumpur (MY); Dalian Institute of Chemical Physics China Academy of Science, Dalian (CN)

( * ) Notice: Subject to any disclaimer, the term of this patent is extended or adjusted under 35 U.S.C. 154(b) by 395 days.

(21) Appl. No.: 17/633,810

(22) PCT Filed: Aug. 8, 2019

(86) PCT No.: PCT/CN2019/099721
§ 371 (c)(1),
(2) Date: Feb. 8, 2022

(87) PCT Pub. No.: WO2021/022535
PCT Pub. Date: Feb. 11, 2021

(65) Prior Publication Data
US 2022/0226781 A1    Jul. 21, 2022

(51) Int. Cl.
*B01D 63/02*   (2006.01)
*A61M 1/18*    (2006.01)
(Continued)

(52) U.S. Cl.
CPC ....... *B01D 63/043* (2013.01); *B01D 19/0031* (2013.01); *B01D 53/1425* (2013.01);
(Continued)

(58) Field of Classification Search
CPC .............. B01D 63/043; B01D 19/0031; B01D 53/1425; B01D 53/1462; B01D 2313/08;
(Continued)

(56) References Cited

U.S. PATENT DOCUMENTS 5,277,176 A    1/1994   Habashi et al.
5,282,964 A *  2/1994   Young ................... B01D 63/04
                                                210/321.89
(Continued)

FOREIGN PATENT DOCUMENTS

CN    101312758 A    11/2008
JP    H07213846 A    8/1995
JP    2000157845 A   6/2000

OTHER PUBLICATIONS

Gao, Yan; International Search Report; PCT/CN2019/099721; dated May 9, 2020; 3 pages.

*Primary Examiner* — Frank M Lawrence, Jr.
(74) *Attorney, Agent, or Firm* — Bradley Arant Boult Cummings LLP

(57) ABSTRACT

A gas exchange system, said system comprising: a plurality of cartridges, each having a casing, said casing having a cartridge inlet adjacent to a first end and a cartridge outlet adjacent to an opposed second end; each casing having a bore in which is placed a gas permeable, liquid impermeable, hollow membrane; each hollow membrane having a membrane inlet arranged to receive a gas from an inlet chamber and a membrane outlet for venting said gas; each cartridge inlet in communication with a concentration zone, and arranged to receive a solvent from said concentration zone, so as to exit said solvent through said cartridge outlet;
(Continued)

wherein said bore is arranged to flow said solvent adjacent to said hollow membrane so as to permit the exchange of gas through said gas permeable, liquid impermeable membrane.

10 Claims, 3 Drawing Sheets

(51) Int. Cl.
*B01D 19/00* (2006.01)
*B01D 53/14* (2006.01)
*B01D 63/04* (2006.01)

(52) U.S. Cl.
CPC ...... *B01D 53/1462* (2013.01); *B01D 2313/08* (2013.01); *B01D 2313/105* (2013.01); *B01D 2313/125* (2013.01); *B01D 2313/16* (2013.01); *B01D 2313/2011* (2022.08); *B01D 2313/26* (2013.01); *B01D 2313/44* (2013.01)

(58) Field of Classification Search
CPC ........ B01D 2313/105; B01D 2313/125; B01D 2313/16; B01D 2313/2011; B01D 2313/26; B01D 2313/44; B01D 53/1468; B01D 53/1475; B01D 53/22; B01D 2053/224; B01D 2257/304; B01D 2257/504; Y02C 20/40
USPC ......... 95/43, 45, 46, 51, 235, 236, 263, 264; 96/4, 6, 7, 8, 10, 249; 423/220, 228, 229
See application file for complete search history.

(56) References Cited

U.S. PATENT DOCUMENTS

| | | | |
|---|---|---|---|
| 2002/0195385 A1* | 12/2002 | Cho | B01D 63/02 210/321.74 |
| 2004/0045893 A1* | 3/2004 | Watanabe | B01D 67/0027 210/321.89 |
| 2011/0036240 A1* | 2/2011 | Taylor | B01D 63/025 96/6 |
| 2015/0053083 A1* | 2/2015 | Taylor | B01D 19/0031 96/6 |
| 2016/0375188 A1 | 12/2016 | Labib et al. | |
| 2019/0240616 A1* | 8/2019 | Eliseev | B01D 69/02 |
| 2022/0250393 A1* | 8/2022 | Suzuki | B41J 2/175 |

* cited by examiner

GAS EXCHANGE SYSTEM AND METHOD

FIELD

The invention relates to a system and method of exchanging gas with a solvent, said gas including CO2 and H2S, both to laden said solvent with said gas, and to strip a gas-laden solvent of said gas.

BACKGROUND

For clarity, reference to CO2 will further apply to H2S and other acidic gases unless the application would make such an extension unworkable.

The use of membrane cartridges involve placing gas permeable/liquid impermeable hollow membrane within a cylinder and passing high temperature gas, such as steam, into the membrane. The solvent is injected into the cartridge so as to fill the interstitial spaces around the membrane whereby the steam strips the acidic gas from the solvent, which subsequently passes into the membrane and exits the cartridge with the condensed steam. The solvent, having the acidic gas removed, is then removed from the cartridge for subsequent downstream use.

It will be appreciated that the process is reversible whereby the acidic gas is passed into a cartridge with the solvent injected about the membrane. The acidic gas then permeates through the membrane to be absorbed by the solvent which subsequently exits the cartridge.

The difficulty in this process is scalability, for those application where the volume of gas and solvent exceeds that of a reasonable cartridge size. A typical cartridge may be 9 inches in diameter, and arranged to process a solvent mass flow rate of the order of 0.8 to 1 kilogram per second. To scale the process by, say, an order of magnitude would involve 10 times the number of cartridges with a weight of the cartridges approaching 10 tonnes.

Alternatively, several membranes could be placed into a single module and thus reducing the weight of the steel casing of individual cartridges. However, the efficiency of a multi-cartridge arrangement is substantially reduced as membranes coinciding with the flow path of the solvent from the inlet to the outlet may be efficiently used. However, membranes outside the flow path may be subject to low flow or no flow conditions and therefore incapable of being fully utilized to receive high gas transfer due to a lack of replenishment of solvent about the fiber.

SUMMARY

In a first aspect, the invention provides a gas exchange system, said system comprising: a plurality of cartridges, each having a casing, said casing having a cartridge inlet adjacent to a first end and a cartridge outlet adjacent to an opposed second end; each casing having a bore in which is placed a gas permeable, liquid impermeable, hollow membrane; each hollow membrane having a membrane inlet arranged to receive a gas from an inlet chamber and a membrane outlet for venting said gas; each cartridge inlet in communication with a concentration zone, and arranged to receive a solvent from said concentration zone, so as to exit said solvent through said cartridge outlet; wherein said bore is arranged to flow said solvent adjacent to said hollow membrane so as to permit the exchange of gas through said gas permeable, liquid impermeable membrane.

Therefore, by providing a concentration zone for receiving the solvent which is discrete from the solvent outlet, the flow path for the solvent is confined to being proximate to the membranes thus maintaining an efficient gas transfer. This may lead to substantially improved scalability with no clear limitation of the size of the regeneration plant.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION

In general terms, the invention involves placing a concentration zone in fluid communication with inlets for a plurality of cartridges, the cartridges having hollow membranes within a bore of the cartridges, for transporting gas. The hollow membranes are gas permeable but liquid impermeable. By passing the solvent through the bore of the cartridges, so as to be proximate with the external surface of the membranes, a more efficient exchange of gas will occur. The gas is then vented from the membranes, and the solvent flowing out of the cartridges.

FIGS. 1A to 1D, and FIGS. 2A and 2B, show a solvent regeneration module 5 according to one embodiment of the present invention. It will be appreciated that whilst reference is made to the module being used for regeneration, it is equally applicable to the reverse process whereby new solvent is infused with acidic gas. Therefore, whilst the following description makes reference to regeneration, the invention is not limited to the use with a regeneration process but is also applicable to the gas infusion process.

Figure 1A:
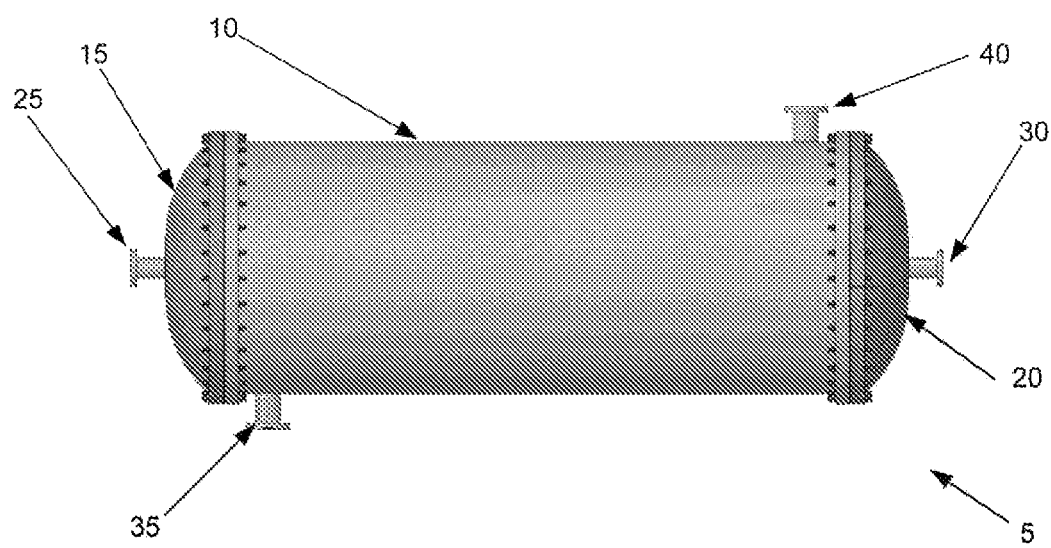
FIGS. 1A to 1D show various views of a regeneration module according to one embodiment of the present invention.

FIG. 1A shows an elevation view of a module 5 having a housing 10 with end caps 15, 20. The end caps 15, 20 include a gas inlet 25 and a gas outlet 30, respectively. Further, the housing 10 includes an inlet 35 for receiving liquid solvent and outlet 40 for exiting said liquid solvent.

Figure 1B:
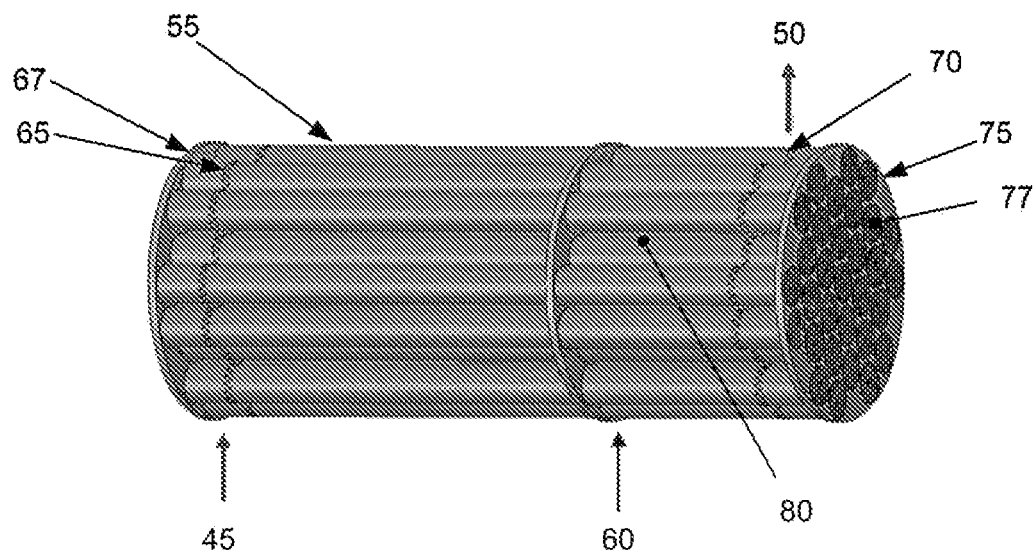
Figure 1C:
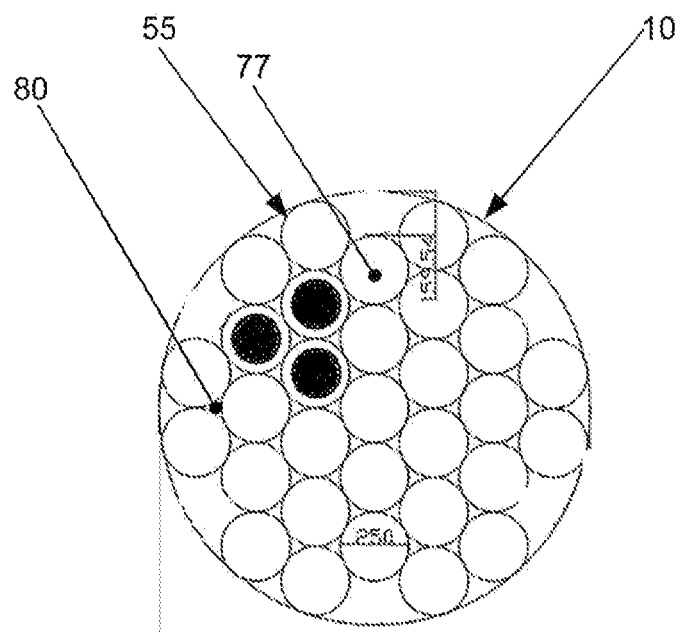
Figure 1D:
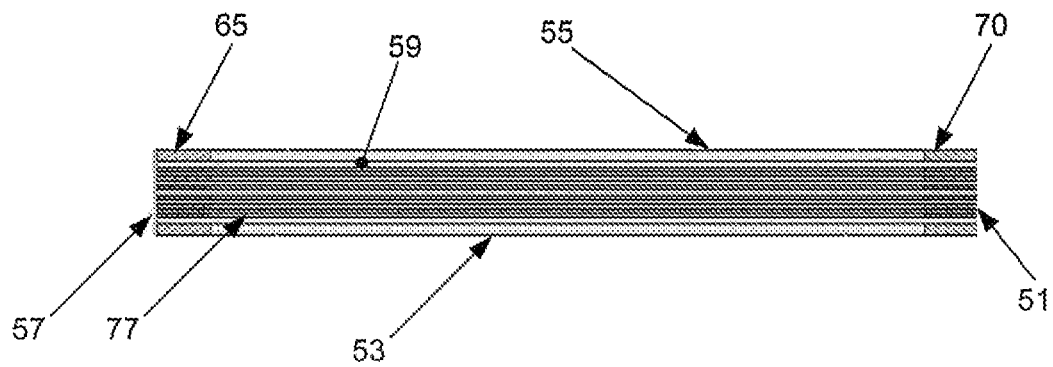

FIGS. 1B and 1C show a plurality of cartridges 55 which are grouped in parallel and held in place by support plates 67, 75. The inlet end cap 15 and inlet support plate 67 define an inlet chamber into which the gas is injected through the inlet 25. Each cartridge 55 includes an open end 57 which permits the gas from the inlet chamber to enter into the cartridge 55 and specifically through hollow longitudinal membranes 77. Each cartridge may have one or more membrane located within, depending upon the required flow rate and optimal size of the membrane.

The cartridge 55 further includes interstitial spaces 59 within the bore of the cartridge for receiving solvent, as will be discussed below. The entire cartridge 55 is then sealed around the periphery by a casing 53. The gas is permitted to vent 51 into an outlet chamber defined by outlet support plate 75 and outlet end cap 20 which feed the gas through to the outlet 30.

The solvent enters the housing 10 through the inlet 35 which allows the liquid solvent to flow about the cartridges 55, within an interstitial space 80. The cartridge housing 53, however, prevents direct contact between the solvent within the interstitial space 80 from contacting the membranes 77. According to the present invention, the solvent entering 45 the housing 10 is directed to flow into ingress apertures 65 so as to flow through the cartridge 55 within the interstitial space 59 and thus contact with the membrane 77 before exiting the cartridge 55 through ingress apertures 70.

This arrangement provides a fluid path for the solvent that places the solvent in close proximity to the membranes, and so solves the issue of having a sufficient flow for an efficient gas transfer.

In a further embodiment, the invention provides baffle plates 60 which define concentration zones.

Figure 2A:
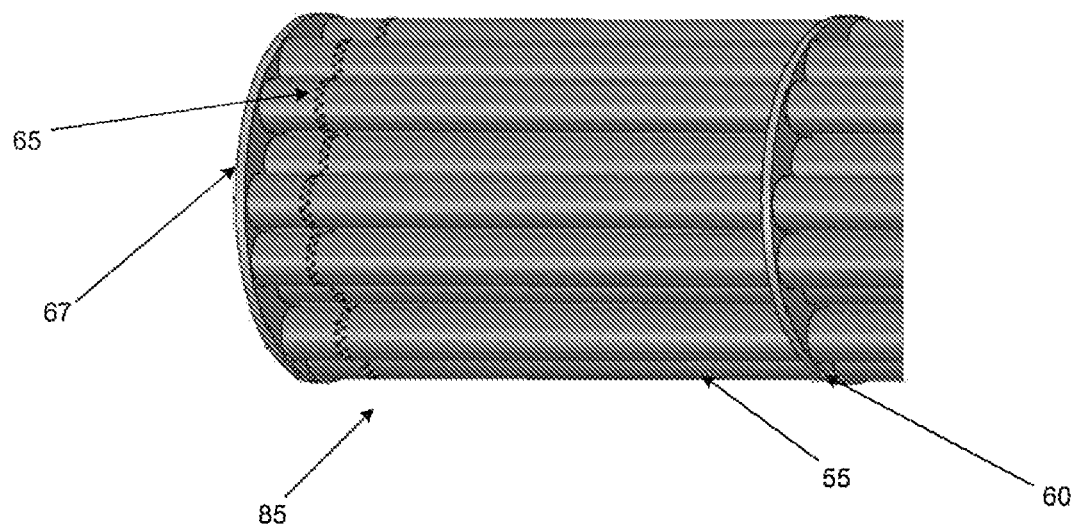
FIGS. 2A and 2B are various views of a concentration zone for a module according to a further embodiment of the present invention.
Figure 2B:
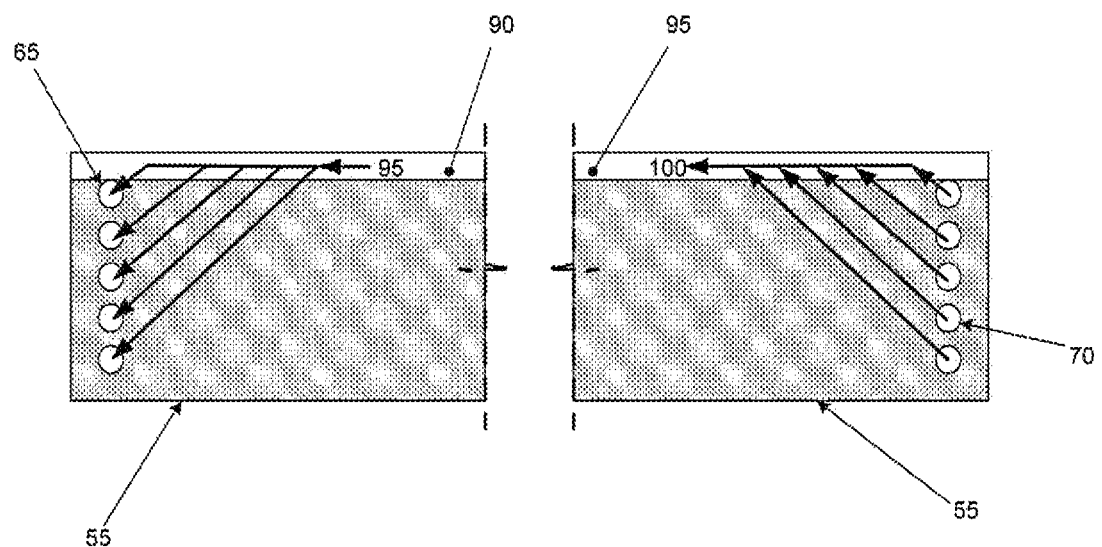

With reference to FIGS. 2A and 2B, the baffle plates 60 define a concentration zone 85 that separates the interstitial spaces 90 near the inlet, ensuring all the solvent flows 95 into the ingress apertures 65 without the solvent escaping directly through the outlet 40. Thus, the use of baffle plates 60 defines a concentration zone 85 which is discrete from the outlet 40, ensuring a flow path for the solvent that is in close proximity to the membranes and thus fully utilizing each of the membranes within the group of cartridges. Once the solvent has flowed through the length of the cartridge 55 it exits from the ingress apertures 70 flowing 100 into the interstitial space 95 proximate to the outlet 40.

It will be appreciated that whilst FIG. 1B shows the position of the baffle plate 60 at approximately two thirds the length of the module 5, in fact the position will be a function of the flow rate 45 into the module 5, the size of the apertures 65, 70 and the desired gas flow rate during the gas transfer within the cartridges. Accordingly, the size of the concentration zone may vary from application to application, subject to various design parameters based upon permeability, flow rate etc.

Further still, in FIG. 1B the baffle plate 60 also acts as an intermediate support plate. The invention is not limited by the number of intermediate support plates and only those intermediate support plates defining a concentration zone may be considered a baffle plate.

The invention claimed is:

1. A gas exchange system comprising:
   a plurality of cartridges, each of the plurality of cartridges being sealed around the periphery thereof by a casing, the casing having a cartridge inlet adjacent to a first end and a cartridge outlet adjacent to an opposed second end;
   each casing having a bore in which is placed a gas permeable, liquid impermeable, hollow membrane;
   each hollow membrane having a membrane inlet arranged to receive a gas from an inlet chamber and a membrane outlet for venting the gas;
   each cartridge inlet in communication with a concentration zone, and arranged to receive a solvent from the concentration zone, so as to exit the solvent through the cartridge outlet; and
   wherein the bore is arranged to flow the solvent adjacent to the hollow membrane so as to permit the exchange of gas through the gas permeable, liquid impermeable membrane.

2. The gas exchange system according to claim 1, further comprising a housing within which the cartridges are positioned.

3. The gas exchange system according to claim 2, wherein the concentration zone is located in interstitial voids between the cartridges and between the cartridges and an inner wall of the housing.

4. The gas exchange system according to claim 3, comprising a baffle plate within the housing dividing the interstitial voids proximate to the cartridge inlet from a remaining portion of the interstitial voids, the interstitial voids proximate the inlet defining the concentration zone.

5. The gas exchange system according to claim 4, wherein the housing comprises a solvent inlet in communication with the concentration zone.

6. The gas exchange system according to claim 2, wherein the housing comprises a solvent outlet in fluid communication with the cartridge outlets.

7. The gas exchange system according to claim 2, wherein the housing comprises a gas inlet in fluid communication with the inlet chamber.

8. The gas exchange system according to claim 2, wherein the housing comprises an outlet chamber and a gas outlet for venting the gas from the outlet chamber, the outlet chamber in fluid communication with the membrane outlets.

9. The gas exchange system according to claim 1, wherein the membrane inlet is arranged to receive high temperature gas and the concentration zone is arranged to receive $CO_2$-laden solvent, the system arranged to strip $CO_2$ from the $CO_2$-laden solvent within the cartridges and vent the gas and $CO_2$ through the membrane outlets, the $CO_2$-stripped solvent arranged to exit the system through the cartridge outlets.

10. The gas exchange system according to claim 1, wherein the membrane inlet is arranged to receive $CO_2$ and the concentration zone is arranged to receive solvent, the system arranged to exchange $CO_2$ through the membrane to the solvent within the cartridges, the $CO_2$-laden solvent arranged to exit the system through the cartridge outlets.

* * * * *